(12) United States Patent
Fekety et al.

(10) Patent No.: US 8,393,478 B2
(45) Date of Patent: Mar. 12, 2013

(54) INORGANIC MEMBRANES AND METHOD OF MAKING

(75) Inventors: Curtis Robert Fekety, Tioga, PA (US); Wei Liu, Painted Post, NY (US); Zhen Song, Painted Post, NY (US); Joseph Marc Whalen, Halifax (CA)

(73) Assignee: Corning Incorporated, Corning, NY (US)

( * ) Notice: Subject to any disclaimer, the term of this patent is extended or adjusted under 35 U.S.C. 154(b) by 1503 days.

(21) Appl. No.: 11/894,065

(22) Filed: Aug. 20, 2007

(65) Prior Publication Data
US 2012/0132584 A1 May 31, 2012

Related U.S. Application Data

(60) Provisional application No. 60/903,637, filed on Feb. 27, 2007.

(51) Int. Cl.
*B01D 71/02* (2006.01)
*B01D 67/00* (2006.01)
*B01D 69/00* (2006.01)

(52) U.S. Cl. ............ 210/490; 210/500.21; 210/504; 210/509; 210/500.25; 210/506; 427/244; 427/246; 427/247; 427/376.2; 427/383.5

(58) Field of Classification Search .................. None
See application file for complete search history.

(56) References Cited

U.S. PATENT DOCUMENTS

| | | | |
|---|---|---|---|
| 5,006,248 A | 4/1991 | Anderson et al. ........ 210/500.25 |
| 5,208,190 A | 5/1993 | Anderson et al. ............... 501/12 |
| 6,225,246 B1 | 5/2001 | Darcovich | |
| 6,464,881 B2 | 10/2002 | Thoraval ........................ 210/652 |
| 6,649,255 B1 | 11/2003 | Fain, Sr. et al. ............ 428/312.2 |
| 6,841,497 B1 | 1/2005 | Krell et al. | |

FOREIGN PATENT DOCUMENTS

WO 2006/034717 A1 4/2006

OTHER PUBLICATIONS

Changrong, et al., "Boehmite sol properties and preparation of two-layer alumina membrane by a sol-gel process", Journal of Membrane Science, 116(1996) 9-16.*
Santos et al., Standard Transition Alumninas, Electron Microscopy Studies., Material Research vol. 3, No. 4, 104-114, 2000.*
Rooksby, et al., "The Formation and Structure of Delta Alumina", Philips Research Laboratories, Netherlands, 1961.*
"Plasma-enhanced modification of the pore size of ceramic membranes," S. Alvarez, A. Garcia, S. Manolache, F. Denes, F.A. Riera, R. Alvarez, Eleseview, Desalination 184 (2005) 99-104.
R. Ozao et al.; "Preparation of γ-Alumina Membranes from Sulphuric Electrolyte Anodic Alumina and its Transition to α-Alumina"; Journal of Thermal Analysis and Calorimetry, vol. 64 (2001) 923-932; 2001 Akademiai Kiado, Budapest.

* cited by examiner

*Primary Examiner* — Krishnan S Menon
(74) *Attorney, Agent, or Firm* — Robert P. Santandrea

(57) ABSTRACT

An inorganic membrane having an improved pore structure. The membrane has a mean pore size of up to about 100 nm and a mean particle size in a range from about 10 nm to about 100 nm. In one embodiment, the membrane comprises α-alumina and is formed by providing a coating slip comprising δ-alumina; applying the coating slip to a support surface to form a coating layer; drying the coating layer; and firing the dried coating layer at a temperature of at least about 1000° C. to convert at least a portion of the δ-alumina to α-alumina and form the inorganic membrane.

13 Claims, 17 Drawing Sheets

FIG. 5
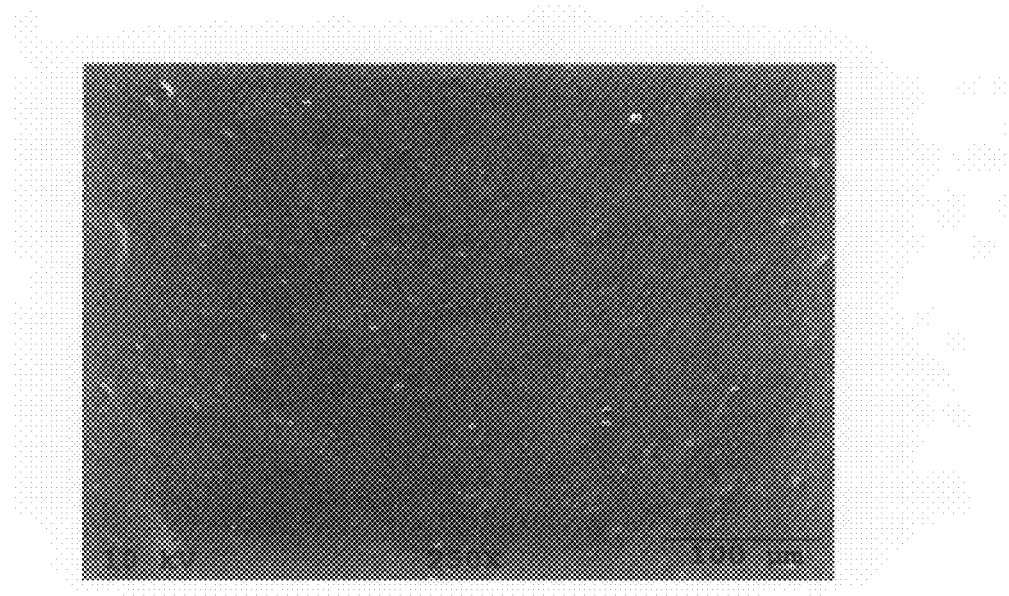
a
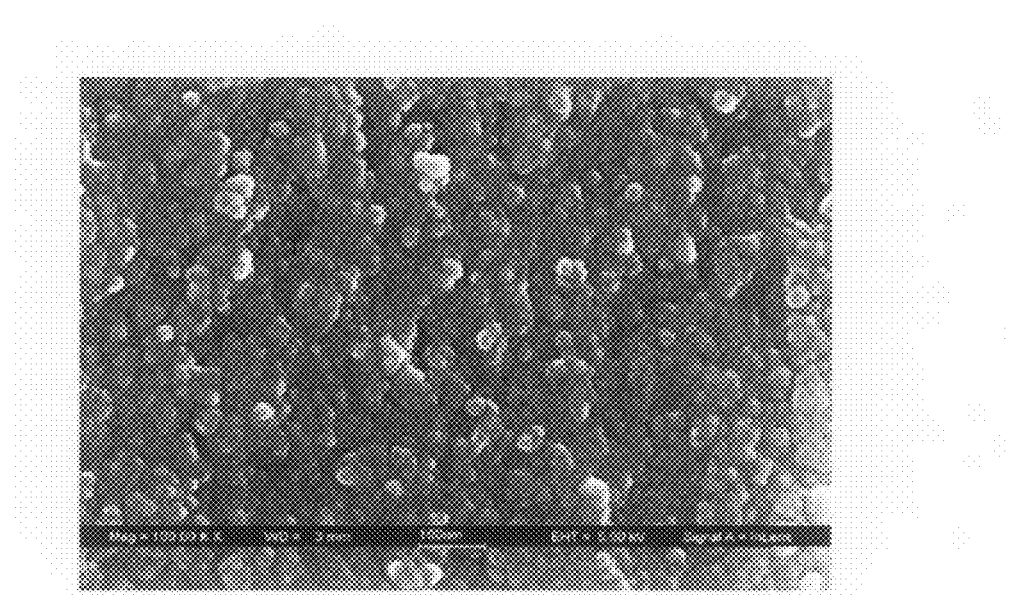
b

FIG. 6
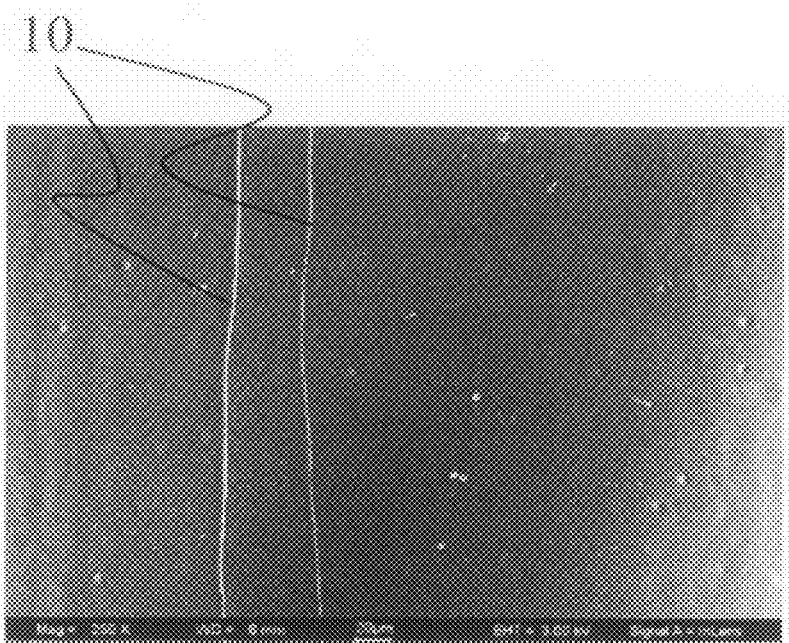
a
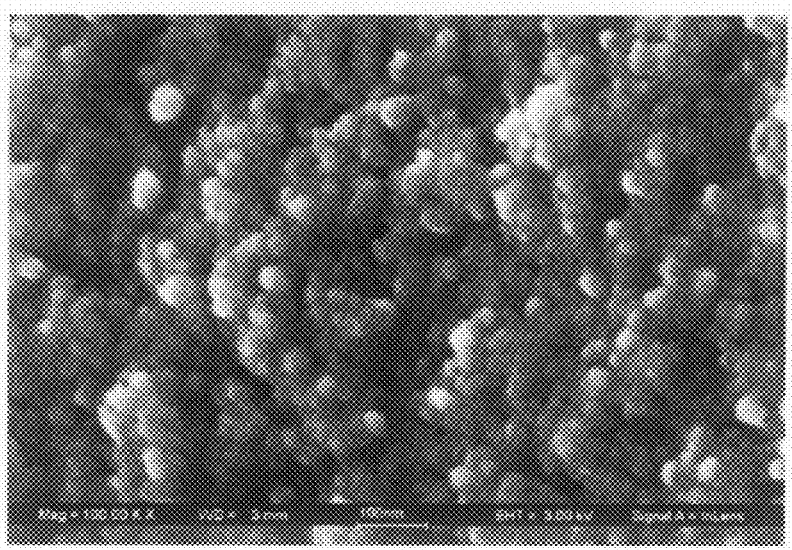
b

FIG. 11
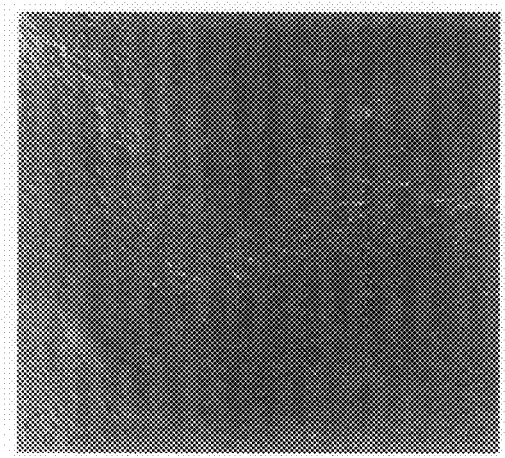
a
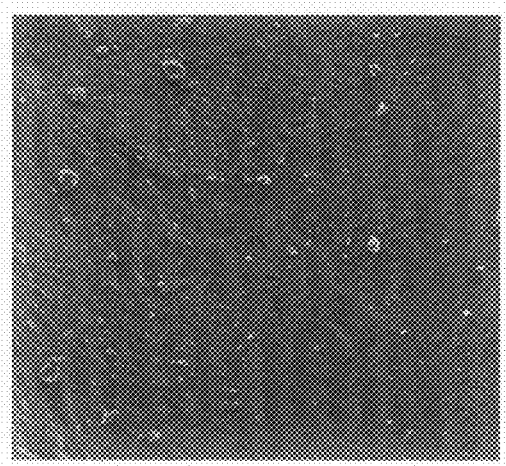
b
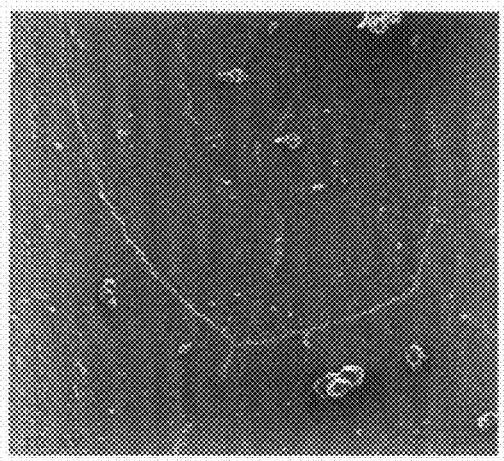
c

FIG. 12
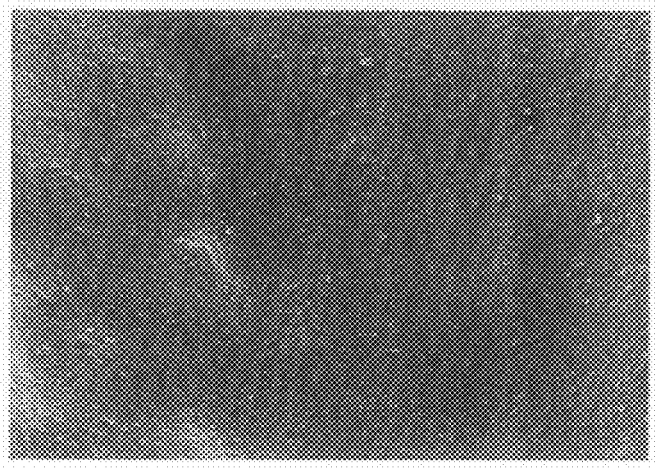
a
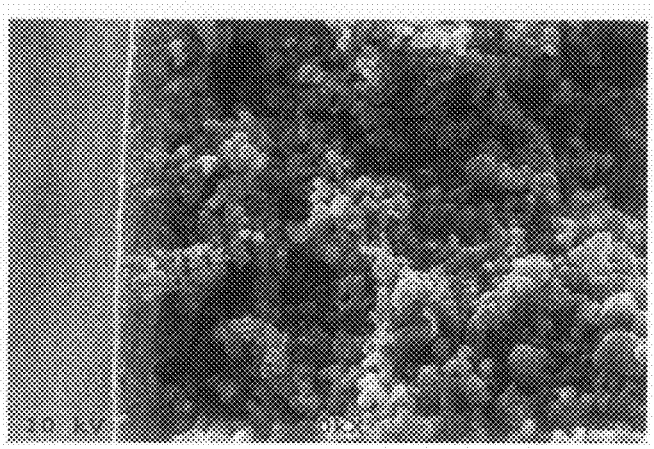
b
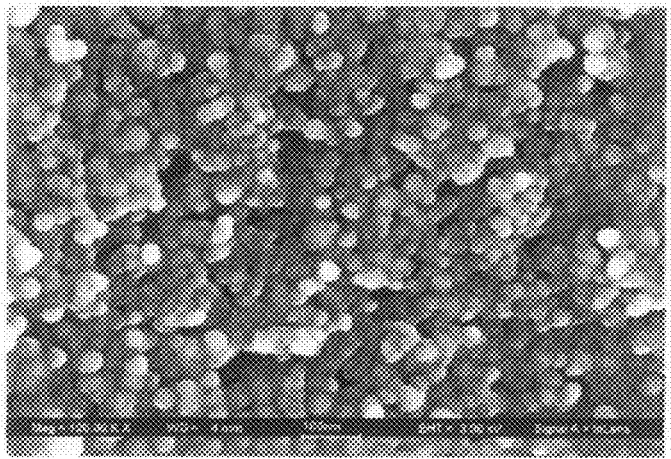
c

FIG. 13
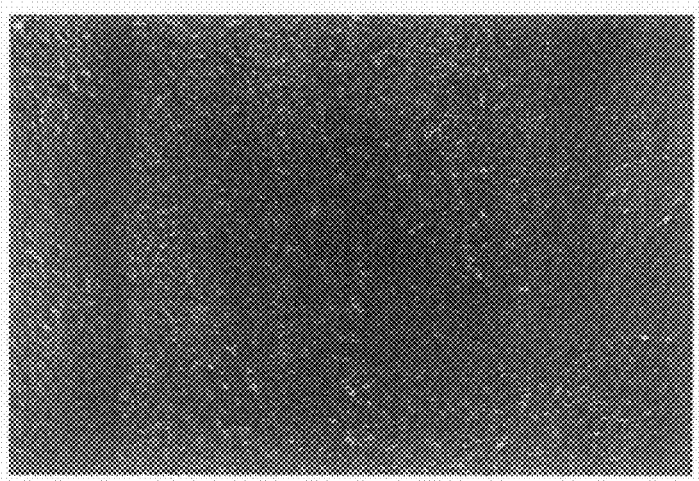
a
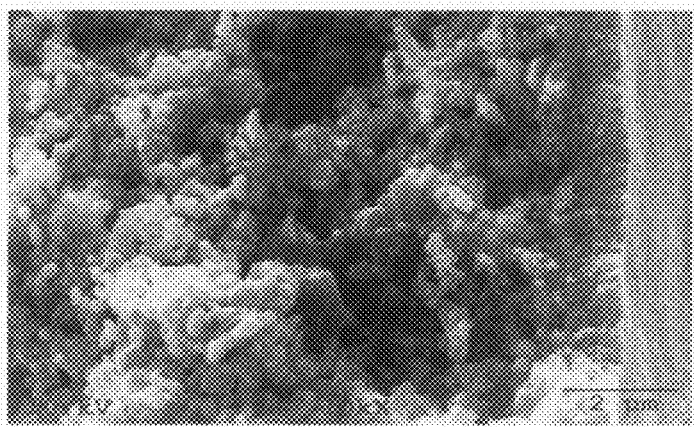
b
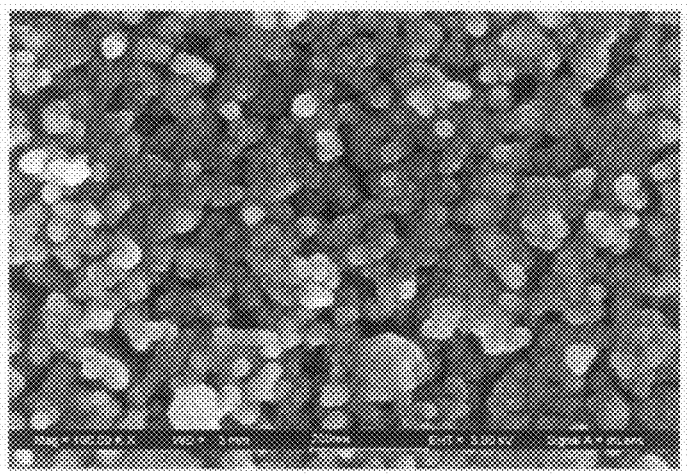
c

INORGANIC MEMBRANES AND METHOD OF MAKING

CROSS-REFERENCE TO RELATED APPLICATION

This application claims the benefit of priority to Provisional Patent Application No. 60/903,637 filed on Feb. 27, 2007, the content of which is relied upon and incorporated herein by reference in its entirety.

BACKGROUND OF INVENTION

The invention relates to porous inorganic membranes. More particularly, the invention relates to a method of making such membranes. Even more particularly, the invention relates to a method of making a porous inorganic membrane coating on a porous ceramic support.

Membranes are porous organic or inorganic films that have separation properties. Inorganic membranes are made of inorganic particles that are partially sintered to form a porous structure. Membranes are classified according to pore size as microfiltration (mean pore size between 0.1 µm and 5 µm) membranes, ultrafiltration (mean pore size between 2 µm and 150 nm) membranes, and nanofiltration (mean pore size between 0.5 µm and 2 nm) membranes. The smaller the pore size of the membrane, the finer the particles that are used to make the membrane.

Inorganic membranes offer several advantages over organic membranes. Inorganic membranes, for example, typically have high chemical and thermal stabilities that allow the membranes to be used in extreme pH and chemical environments. In addition, inorganic membranes can be easily cleaned by applying high temperature treatments such as, for example, firing.

Ultrafiltration membranes are used in the filtration of bacteria, virus, proteins, paint particles, emulsified oil, or protein particles in environmental, food, pharmaceutical, and chemical processing industries. Ultrafiltration membranes are also a necessary underlayer for the deposition of molecular-separation membranes having a mean pore size of less than 1 nm.

Ultrafiltration membranes are typically prepared using a sol-gel process that starts with the preparation of a metal alkoxide solution. The entire process may include hydrolyzing, peptizing, pH-controlling, vaporizing, and sintering to obtain a membrane having a narrow pore size distribution that is controllable from 1-100 nm. Although the sol-gel process is considered one of the best methods for ceramic membrane synthesis, the process is complicated and requires careful control. Moreover, the resulting membrane films have thermal stability problems. Other methods for making ultrafiltration membranes, such as using a cold-plasma to reduce the pore size and repeated chemical vapor deposition and hydroxylation processes, have also been used. The object of such efforts is to simplify the processing steps needed to achieve the desired pore size.

Titanium oxide ($TiO_2$) is commonly used to make such membrane layers. However, since ultrafiltration is usually formed from nanoscale particles, the thermal and hydrothermal stability of these powders become the main challenge. At such small pore and particle sizes, $TiO_2$ membrane material tends to sinter at relatively low temperature, thus reducing the flux through the membrane.

The refractory metal oxide α-alumina ($\alpha$-$Al_2O_3$) is a preferred membrane material. The particle size of α-alumina, however, is usually too large for use in ultrafiltration coatings. Although sufficiently small γ-alumina particles may be formed, this alumina phase is not stable at high temperatures. While γ-alumina can be converted into the α-$Al_2O_3$ phase by calcination at temperatures above 1100° C., such high-temperature calcination substantially reduces the porosity of the membrane layer and makes small γ-alumina particles fuse into much larger particles. Alumina ultrafiltration membranes have been formed using a sol-gel based method. These membranes were fired at temperatures of only up to 500° C., however, and thus lack the high-temperature stability and corresponding long-term durability that is required of ultrafiltration and gas-separation membranes.

Current methods are unable to produce membranes that comprise selected materials, such as α-alumina, and are thermally stable. Therefore what is needed is a method of making inorganic membranes that are thermally stable and have a mean pore size and pore size distribution that enable use in microfiltration applications. What is also needed is an inorganic membrane that is thermally stable.

SUMMARY OF INVENTION

The present invention meets these and other needs by providing an inorganic membrane having an improved pore structure. The membrane has a mean pore size of up to about 100 nm and a mean particle size in a range from about 10 nm to about 100 nm. In one embodiment, the membrane comprises α-alumina and is formed by providing a coating slip comprising δ-alumina; applying the coating slip to a support surface or substrate to form a coating layer; drying the coating layer; and firing the dried coating layer at a temperature of at least about 1000° C. to convert at least a portion of the δ-alumina to α-alumina.

Accordingly, one aspect of the invention is to provide an inorganic membrane that comprises α-alumina. The α-alumina has a pore structure having a mean pore size of up to about 100 nm and a mean particle size in a range from about 10 nm to about 100 nm.

A second aspect of the invention is to provide an inorganic membrane comprising α-alumina. The α-alumina has a pore structure having a mean pore size of up to about 100 nm and a mean particle size in a range from about 10 nm to about 100 nm. The α-alumina is formed by: providing a coating slip comprising δ-alumina; applying the coating slip to a support surface or substrate to form a coating layer; drying the coating layer; and firing the dried coating layer at a temperature of at least about 1000° C. to convert at least a portion of the δ-alumina to α-alumina and form the inorganic membrane.

A third aspect of the invention is to provide an inorganic membrane that comprises α-alumina. The α-alumina has a pore structure having a mean pore size of up to about 100 nm and a mean particle size in a range from about 10 nm to about 100 nm, wherein the pore structure is stable up to about 1400° C. The α-alumina is formed by: providing a coating slip comprising δ-alumina; applying the coating slip to a support surface or substrate to form a coating layer; drying the coating layer; and firing the dried coating layer at a temperature of at least about 1000° C. to convert at least a portion of the δ-alumina to α-alumina to form the inorganic membrane.

A fourth aspect of the invention is to provide a method of making an inorganic membrane that comprises α-alumina. The method comprises the steps of: providing a coating slip comprising δ-alumina; applying the coating slip to a support surface or substrate to form a coating layer; drying the coating layer; and firing the dried coating layer at a temperature of at least about 1000° C. to convert at least a portion of the δ-alumina to α-alumina and form the inorganic membrane, wherein the inorganic membrane has a pore structure having a mean pore size of up to about 100 nm and a mean particle size in a range from about 10 nm to about 100 nm.

These and other aspects, advantages, and salient features of the present invention will become apparent from the following detailed description, the accompanying drawings, and the appended claims.

BRIEF DESCRIPTION OF THE DRAWINGS

FIGS. 5a and 5b are SEM images of an as-deposited γ-$Al_2O_3$ membrane coating on a monolithic substrate, synthesized at 650° C.: a) 250× magnification; and b) 100,000× magnification;

FIGS. 6a and 6b are SEM images of the membrane shown in FIG. 5 after being heated at 900° C.: a) 250× magnification; and b) 100,000× magnification;

FIGS. 11a-c are SEM images of δ-$Al_2O_3$ membrane coatings deposited using coating slips having pH values of: a) 3.2 (250× magnification); b) 3.5 (250× magnification); and c) 3.9 (250× magnification);

FIGS. 12a-c shows SEM images of a membrane prepared using δ-alumina powder having a particle size of 19 nm, dried at 120° C.: a) 250× magnification; b) 10,000× magnification; c) 100,000× magnification; and FIGS. 13a-c shows SEM images of the membrane shown in FIG. 12a-c, after heating at 1200° C.: a) 250× magnification; b) 10,000× magnification; c) 100,000× magnification.

DETAILED DESCRIPTION

Figure 1:
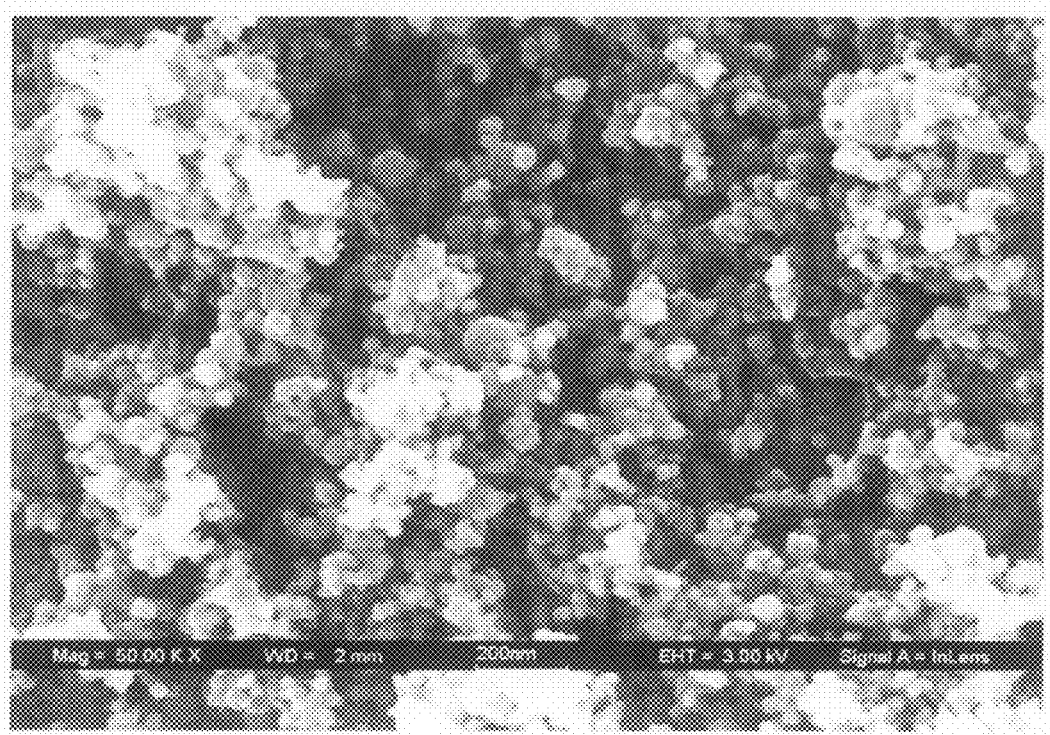
FIG. 1 is a scanning electron microscope (SEM) image (magnification 50,000×) of δ-alumina starting material.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto.

Inorganic membranes comprise inorganic particles that have been partially sintered to form a porous structure. Inorganic membranes generally have higher chemical and thermal stabilities than organic membranes, allowing them to be used in extreme pH and chemical environments. They are also easily cleaned by firing or other high temperature methods.

Due to their thermal and chemical stability, refractory metal oxides are preferred materials for use in ultrafiltration membranes. Not all such oxides, however, are suitable for use in this application. Because ultrafiltration membranes are typically formed from nanoscale particles, the hydrothermal and thermal stability of such particles becomes a consideration. At such small particle and pore sizes, the membrane material tends to sinter at relatively low temperatures, thus reducing the flux through the membrane.

For example, α-alumina (α-$Al_2O_3$), which is a preferred membrane material due to its chemical and thermal stability, is available in a particle size that is too large for use in an ultrafiltration membrane. γ-Alumina (γ-$Al_2O_3$) particles, on the other hand, are sufficiently small, but are not stable at high temperatures. γ-$Al_2O_3$ can be converted to α-alumina by calcination at 1100° C. Such high temperature calcination, however, causes the γ-$Al_2O_3$ particles to fuse into much larger particles and substantially reduces the porosity of the membrane layer.

The present invention provides a porous inorganic membrane comprising α-alumina. The inorganic membrane may be used in applications that include, but are not limited to, ultrafiltration systems, gas separation systems, and other filtration systems. The α-$Al_2O_3$ membrane has an open pore structure that has a mean pore size of up to about 100 nm. In one embodiment, the mean pore size of the membrane is in a range from about 10 nm to about 100 nm, and the mean particle size of the α-alumina is in a range from about 10 nm to about 100 nm. In another embodiment, the mean pore size of the membrane is in a range from about 10 nm to about 50 nm, with individual particles within the inorganic membrane having a mean particle size in a range from about 10 nm to about 50 nm. The α-$Al_2O_3$ membrane may have a thickness in range from about 1 μm to about 10 μm.

The α-$Al_2O_3$ membrane, in one embodiment, is stable up to about 1400° C. In another embodiment, the α-$Al_2O_3$ membrane is stable up to a temperature in a range from about 900° C. to about 1200° C. As used herein, a stable material or membrane is one that is chemically stable and maintains pore size and structure up to a specified temperature.

The α-Al$_2$O$_3$ membrane is prepared using nano-structured δ-alumina powders (also referred to herein as "δ-alumina nanopowders"). The nanoparticles have a mean particle size in a range from about 10 nm to about 100 nm. Mean particle size may be determined by those means known in the art, such as scanning electron microscopy (SEM) and nitrogen adsorption measurements.

A SEM image of δ-alumina nanopowders that are used as starting materials is shown in FIG. 1. As seen in FIG. 1, the δ-alumina nanopowder primarily comprises distinct, individual δ-alumina nanoparticles rather than agglomerated particles. The δ-alumina nanoparticles exhibit excellent thermal stability and maintain the pore structure of the membrane.

The average diameter of the δ-alumina nanopowders shown in FIG. 1 is about 30 nm, as determined by particle size analysis of the SEM image and BET surface area measurements. The surface area of the particles shown in FIG. 1, measured using the BET method, is 55 m$^2$/g. X-Ray diffraction (XRD) measurements show that the alumina powder is primarily δ-alumina.

In one embodiment, the membrane is deposited on a support surface or substrate that has a pore size that is substantially larger than the pore size of the membrane. For example, the support surface or substrate may have a pore size that is at least two times greater than that of the membrane. In a particular embodiment, the support structure or substrate is a geometric structure comprising monolithic channels, each of which has a diameter of less than about 2 mm. The underlying support structure or substrate preferably has greater chemical and thermal stability than the membrane. While support structures or substrates comprising α-alumina are particularly useful, other ceramic materials such as, but not limited to, mullite, may also be used. In another embodiment, the membrane may be formed as a free-standing film.

Figure 2:
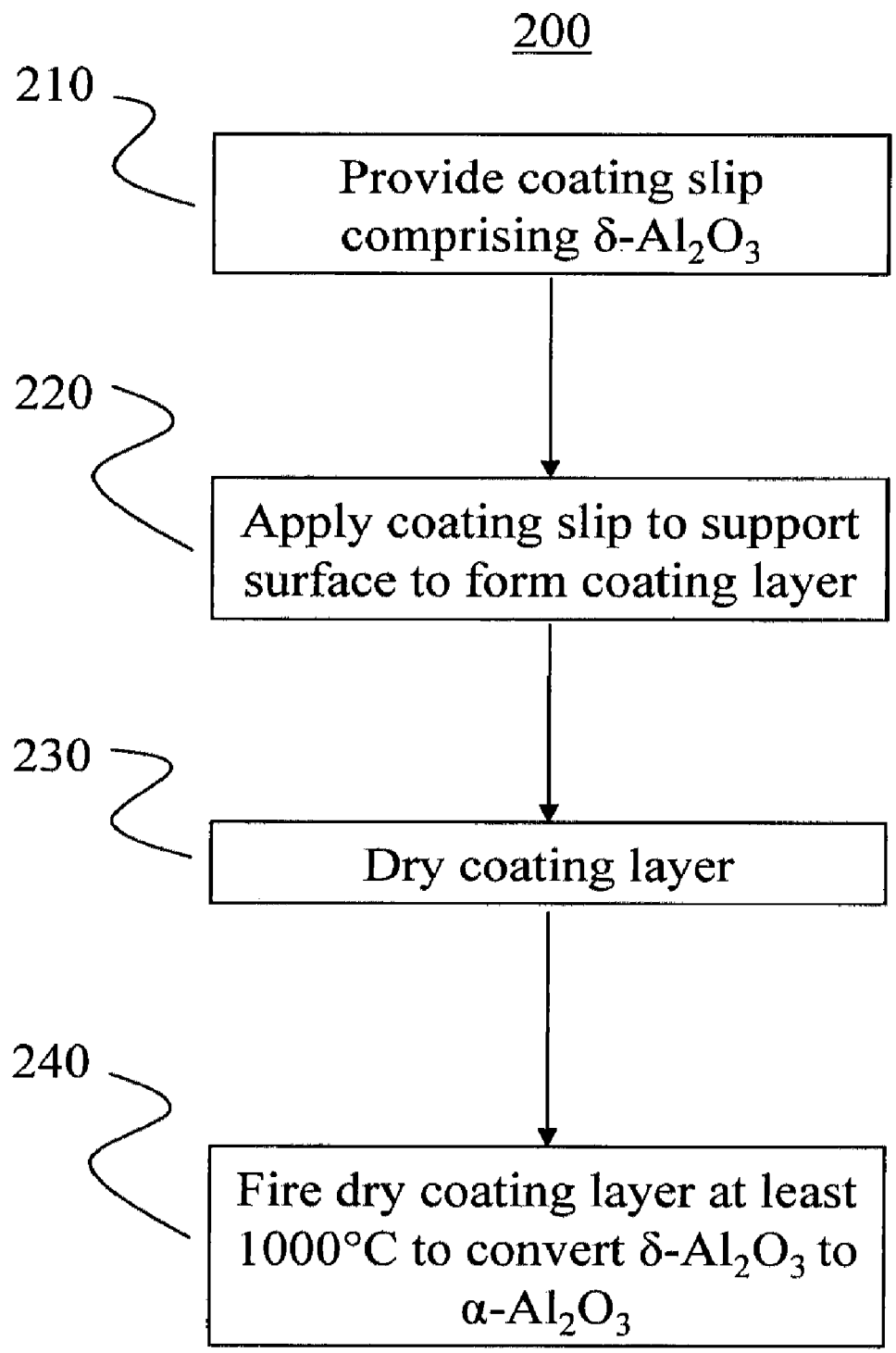
FIG. 2 is a flow chart for a method of making a membrane.
Figure 3:
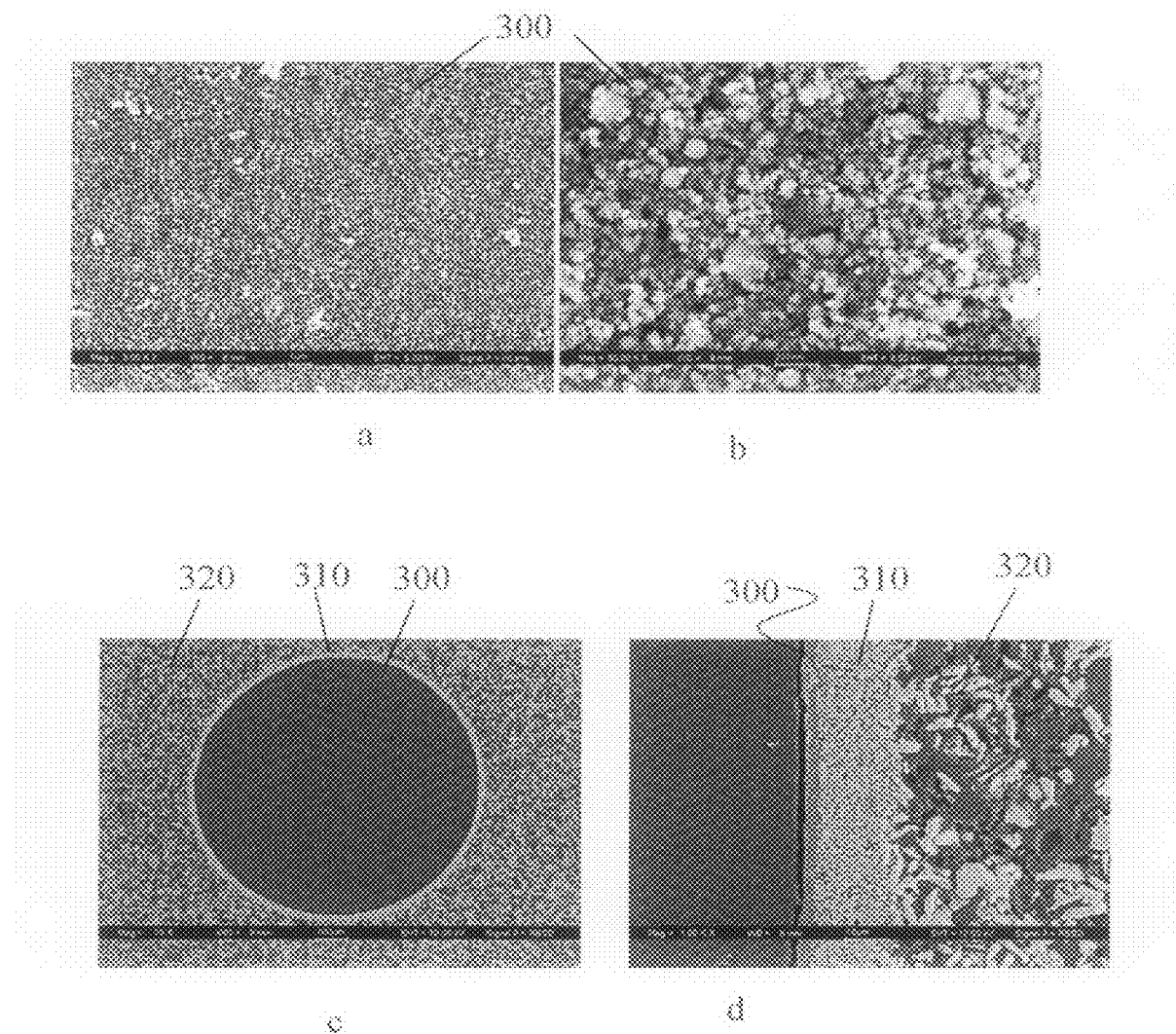
FIGS. 3a-d are SEM images of a membrane surface and cross-section after firing at 900° C.: a) surface, 5,000× magnification; b) surface, 50,000× magnification; c) cross-section, 75× magnification; and d) cross-section, 1,000× magnification.
Figure 4:
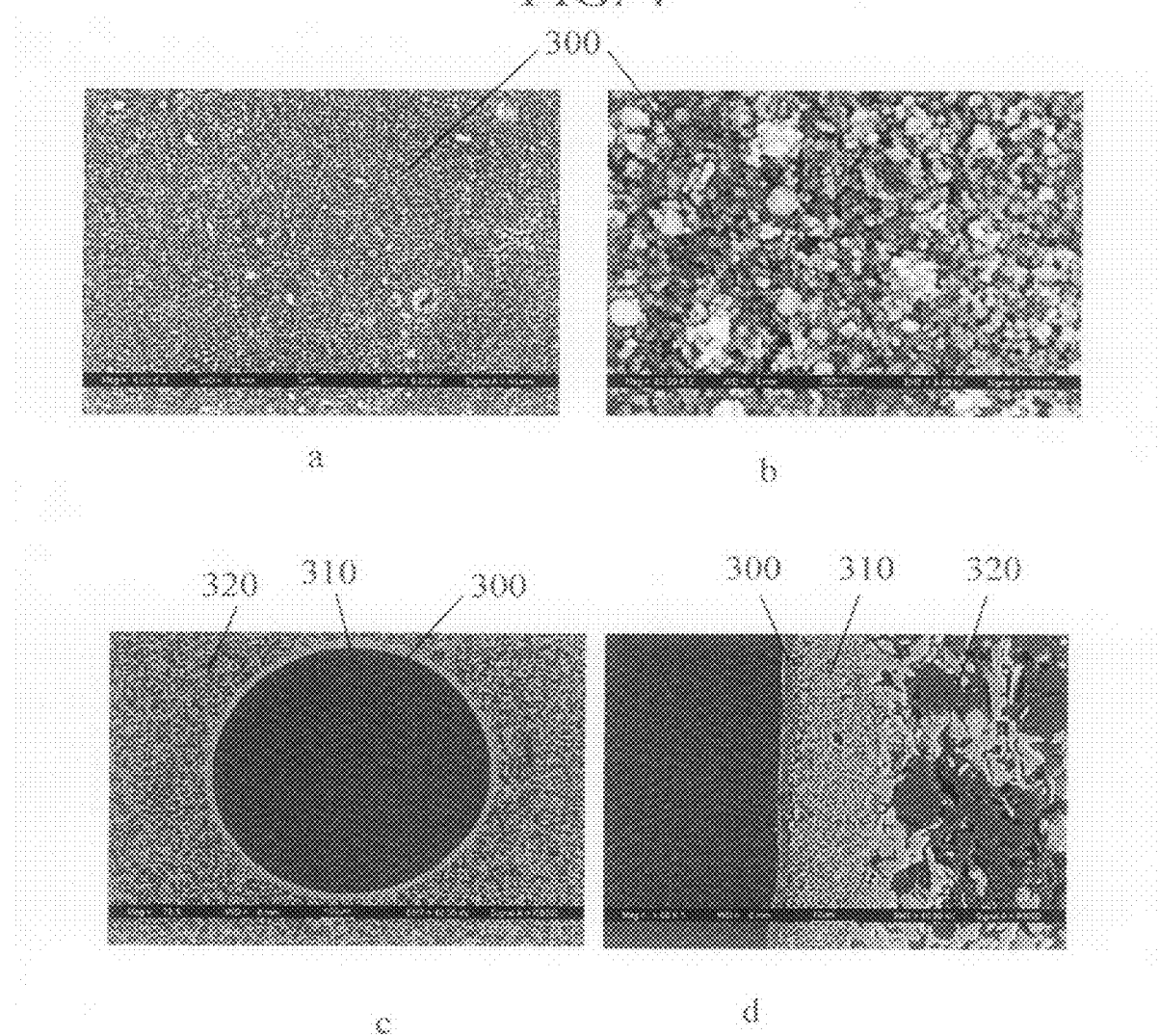
FIGS. 4a-d shows SEM images of a membrane surface and cross-section after firing at 1200° C.: a) surface, 5,000× magnification; b) surface, 50,000× magnification; c) cross-section, 75× magnification; and d) cross-section, 1,000× magnification.

A method of making the inorganic membrane is also provided. A flow chart outlining the method is shown in FIG. 2. In Step 210, a coating slip is provided. As used herein, the term "coating slip" describes a slurry or any other suspension comprising at least one solid and a liquid that is used to form a ceramic coating on a substrate or support. The coating slip is formed using δ-alumina nanoparticles and nanopowders that have been previously described. The nanoparticles are dispersed in a solution. In one embodiment, the particles are provided to an aqueous solution.

Organic compounds and polymeric additives may also be added to the solution. Such additives minimize interaction between the δ-alumina nanopowders, thus preventing agglomeration. The additives also minimize cracking of the membrane during subsequent drying. In one embodiment, polyethylene glycol (PEG) is used as a polymeric binder. The PEG binder has a molecular weight up to about 20,000 and, in one embodiment, in a range from about 2,000 up to about 20,000. The molecular weight of the polymeric binder should be such that the size of the polymeric binder matches the particle size of the nanoparticles. The size of the polymeric binder should be sufficiently large to prevent interaction between the δ-alumina nanoparticles, but not so large as to form large pores or voids upon firing of the membrane.

The solution has a weight loading of δ-alumina nanoparticles in a range from about 0.1 wt. % to about 10 wt. %. The solid δ-alumina loading affects the thickness slip that is applied to a support or substrate; higher δ-alumina concentrations tend to produce a thicker, more viscous slip, which in turn tends to produce a thicker coating and membrane.

In Step 220, the coating slip formed in Step 210 is applied to at least one surface of a support or substrate to form a coating layer. The support or substrate may comprise a ceramic material such as, but not limited to, α-alumina, mullite, combinations thereof, and the like. The support or substrate may be monolithic or, in one embodiment, comprise a plurality of channels, and may have porosity on the order of hundreds of nanometers (i.e., 100 nm-1000 nm). Application of the coating slip to a substrate may be accomplished by those means widely known in the art, such as, but not limited to, dip coating, spin coating, spray coating, slip casting, forced flow coating, and the like. Any of these techniques may be performed individually or in combination with each other.

Once applied to the substrate, the coating slip is dried (Step 230). The drying step, in one embodiment, is carried out in a controlled gas environment to prevent cracking or peeling of the coating formed by the applied coating slip on the substrate. The controlled gas environment is one in which the content of at least one of oxygen (O$_2$) and water content is controlled. The oxygen content of the controlled atmosphere is typically kept to a minimum. For example, Step 230 may be carried out by drying the coating layer under flowing nitrogen and water, while heating the coating layer according to a temperature schedule in which the coating layer is heated from room temperature up to a maximum temperature of about 120° C., with at least one hold at a predetermined intermediate temperature (or temperatures). A typical heating profile and gas and water flow rates for drying Step 230 are shown in Table 1.

TABLE 1

Heating Profile, Gas and Water Flow Rates for Drying Coating Layer

| | Accumulated time (hours) | hour | Temp (° C.) | |
|---|---|---|---|---|
| Seq 1 | 0 | 0.30 | | 20 to 30° C. in 18 min |
| Seq 2 | 10.3 | 10 | 30 | Hold 10 h at 30° C. |
| Seq 3 | 15.3 | 5 | | Ramp temperature from 30 to 80° C. at 10° C./h |
| Seq 4 | 17.3 | 2 | 80 | Hold at 80° C. |
| Seq 5 | 21.3 | 4 | | Ramp temperature to 120° C. at 10° C./h |
| Seq 6 | 26.3 | 5 | 120 | Hold at 120° C. |
| Seq 7 | 28.0 | 1.67 | 20 | cool down to room temp at 60° C./h (1 hr 40 min) |
| N2 flow rate, sccm | | | | 1000 |
| Water flow rate, cc/h | | | | 1.8 |
| Water addition time, h | | | | 26.3 |

The dried coating layer is then fired at a temperature in a range from about 900° C. to about to 1200° C. under a controlled gas environment. The firing causes the δ-alumina to convert to α-alumina. In addition, the firing removes the organic components and solidifies the membrane structure.

The following examples illustrate the features and advantages of the invention, and are in no way intended to limit the invention thereto.

Example 1

Preparation of Coating Slips Comprising of δ-Alumina and Polyethylene Glycol

The general procedure for preparing coating slips is as follows. In subsequent examples, the same procedure is used to prepare coating slips having different concentrations of δ-alumina and polyethylene glycol, δ-alumina nanopowders having different mean particle sizes, and different molecular weights of polyethylene glycol.

Aqueous solutions containing 4.5 wt. % PEG (polyethylene glycol, 2,000 MW or 20,000 MW) were prepared and stirred for at least one hour to ensure complete solution.

Slips were made by adding 1 g of δ-alumina powder to 50 g of the PEG solution and 50 g ultra-pure (18 MΩ) water, along with 2 drops of 1 wt. % DC-B antifoam agent. The morphology of the δ-alumina starting material is shown in FIG. 1. The average diameter of the δ-alumina nanoparticles seen in FIG. 1 is about 30 nm, as determined by particle size analysis of the SEM image and BET surface area measurements. A small amount of large spherically shaped particles having a size of about 100 nm are also observed. The surface area of the particles shown in FIG. 1, measured using the BET method, is 55 m$^2$/g. XRD measurements show that the alumina powder is primarily δ-alumina.

Each slip was hand-shaken until well-mixed, and placed in an ice bath to chill. The slip was then shaken again and agitated in six 10-second bursts, with a 10 second pause between bursts, using an ultrasonic horn set at 80%. The slip was then de-gassed by pulling a vacuum on a 150 mL filter flask for 15 minutes, or until bubbling stopped, and gently transferred to a beaker for coating application.

Example 2

Coating of Substrates and Formation of α-Alumina Membrane onto Monolithic Channels The procedure used for coating monolithic alumina substrates is as follows. Monolithic substrates of 10 mm diameter were cut to lengths of either 3 inches (7.62 cm) or 6 inches (15.24 cm). Each substrate had 19 through channels. Each of the through channels had a diameter of 0.75 mm. The substrates were flushed with water to remove debris, and then dried overnight at 60° C. in air.

Two batches of δ-Al$_2$O$_3$ having particle sizes of 30 nm and 19 nm, respectively, were formed into ultrafiltration membranes. Slips prepared according to the procedure described in Example 1 were used to coat substrates using a flow coater apparatus, with a 10 second soak time. Prior to coating, the pH value of each slip was adjusted to 3.2 using acetic acid. The coated substrate was dried in water vapor (1.8 mL/hr) and N$_2$ gas (1 L/min) with a temperature ramp of 10° C./hr to 120° C. Each coated substrate was held at 120° C. for about two hours and then cooled in nitrogen gas. The dried sample was calcined/fired at 900° C. and 1200° C. for two hours in flowing 1% oxygen in N$_2$ with a temperature ramp of 2° C./min to form the membranes.

Example 3

Thermal Stability of α-Alumina Membranes

Before depositing the membrane, two pre-coating layers were deposited on the substrate such that the pre-coating is disposed between the membrane and substrate. Slips comprising 1 wt. % of δ-alumina and 2.3 wt. % PEG having molecular weights of either 2,000 MW or 20,000 MW were used to coat an α-alumina substrate with two layers of progressively finer α-alumina pre-coatings. The pore size of the last α-alumina pre-coating layer was several hundred nanometers.

FIGS. 3a-c and 4a-c show SEM images of the surfaces and cross-sections of membranes fired at 900° C. and 1200° C., respectively. Membrane 300, pre-coating 310, and substrate 320 are shown at various magnifications in FIGS. 3a-c and 4a-c. The thickness of membrane 300 is about 3 μm and the pore size is about 20 nm. The particle sizes in the membranes do not exhibit any apparent increase compared with the original δ-alumina particles. X-Ray diffraction patterns obtained for the membrane indicate that the membrane to a mixture of δ-alumina and θ-alumina after firing at 900° C. After firing at 1200° C., the membrane had been transformed mostly to the α-alumina phase.

Example 4

Comparative Example

Thermal Stability of γ-Al$_2$O$_3$

Figure 7:
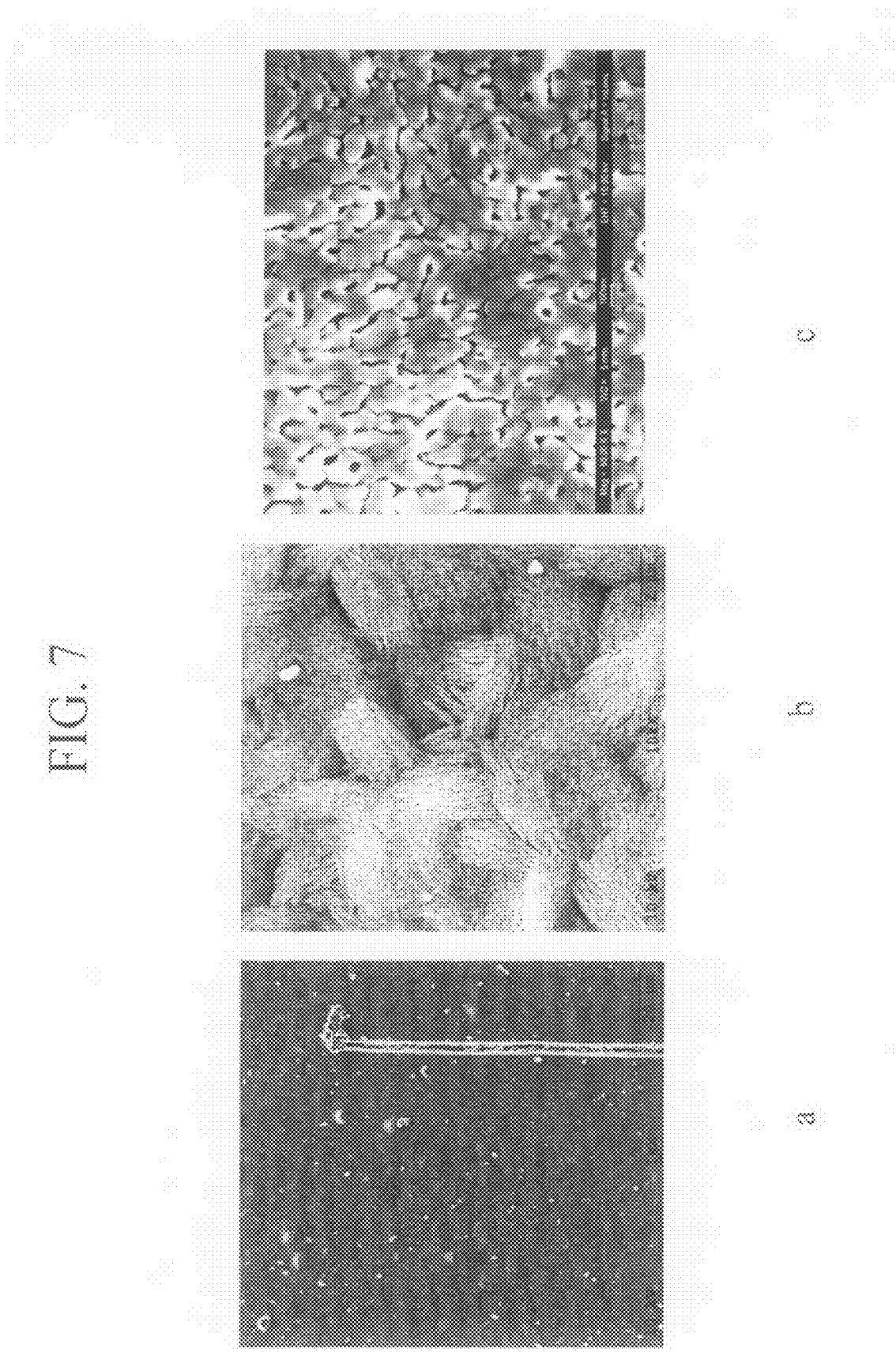
FIG. 7a-c are SEM images of the membrane shown in FIG. 5 after being heated at 1200° C.: a) 1,000× magnification; b) 10,000× magnification; and c) 50,000× magnification.

A γ-Al$_2$O$_3$ membrane was deposited on a monolithic substrate, such as those described in Example 1. SEM images of the as-deposited γ-Al$_2$O$_3$ coating, which was synthesized at 650° C., are shown in FIGS. 5a (250× magnification) and 5b (10,000× magnification), respectively. FIGS. 6a-b and 7a-c are SEM images showing changes in γ-Al$_2$O$_3$ membrane morphology after being heated to 900° C. and 1200° C., respectively. The average particle size of as-deposited γ-Al$_2$O$_3$ is usually about several nm in diameter. FIG. 6b shows these particles tend to agglomerate. After heating at 900° C., the particles within the agglomerates start to sinter to form larger particles (~30 nm), shown in FIG. 6b. This sintering results in the formation of line cracks 10 on the membrane, as seen in FIG. 6a. Further heating at 1200° C. (FIG. 7a-c) causes severe sintering (FIG. 7c), which can be seen in as coarsening of the surface in FIG. 7a, and complete reconstruction of the membrane surface (FIG. 7b).

Example 5

Water Permeability Tests

Water permeability tests were performed on membranes prepared according to the procedures described in Examples 1 and 2. The membranes were fired at either 900° C. or 1200° C. The water permeability measurements give an estimation of the pore size and porosity of the membranes. A commercially available (CCIC, Corning Incorporated) ultrafiltration membrane having a pore size of 10 nm was used as a benchmark for these tests.

Figure 8:
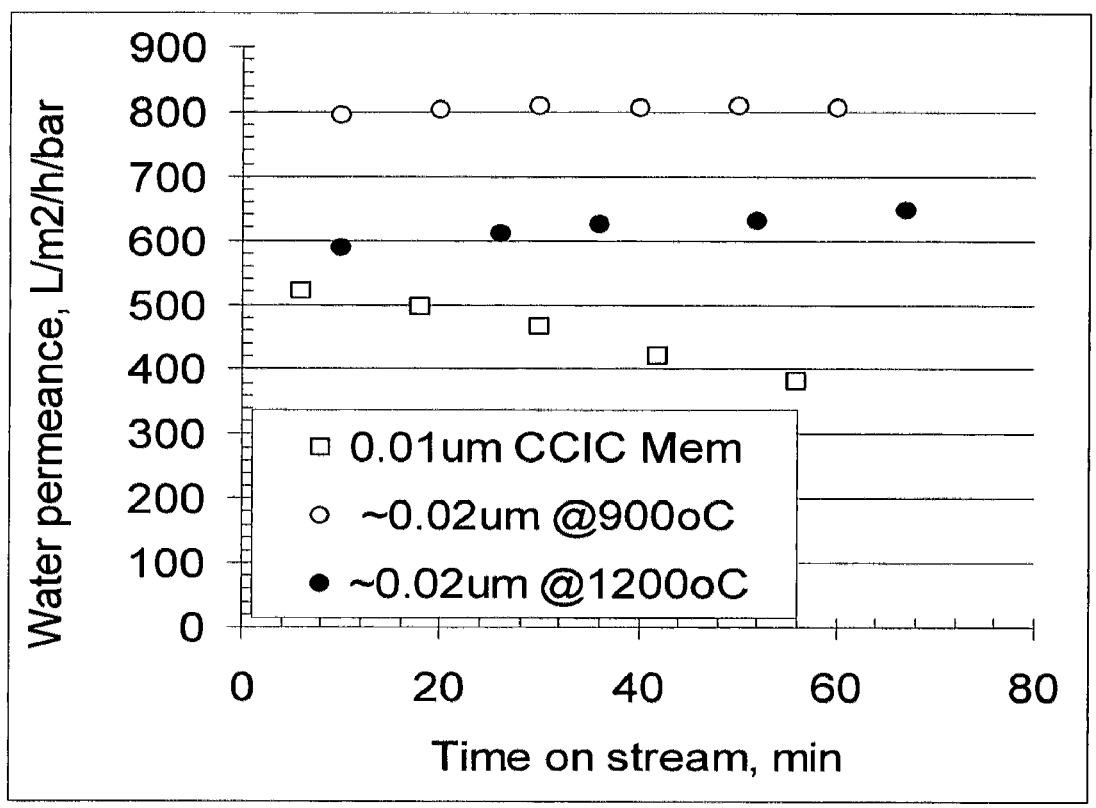
FIG. 8 is a plot of results obtained for a water permeability test using the membranes described herein.

Results of the water permeability tests on these membranes and the CCIC membrane are shown in FIG. 8. Membranes fired at 900° C. and 1200° C. exhibited greater permeability than the CCIC membrane. In addition, the permeability of the membranes prepared according to the procedures described herein remained essentially constant with increasing time on stream, whereas the permeability of the CCIC membrane decreased over time. The permeability of the membrane fired at 1200° C. is about 25% less than that of the membrane fired at 900° C., indicating that firing at the higher temperature produced a higher degree of sintering.

Example 6

Ultrafiltration Tests

Figure 9:
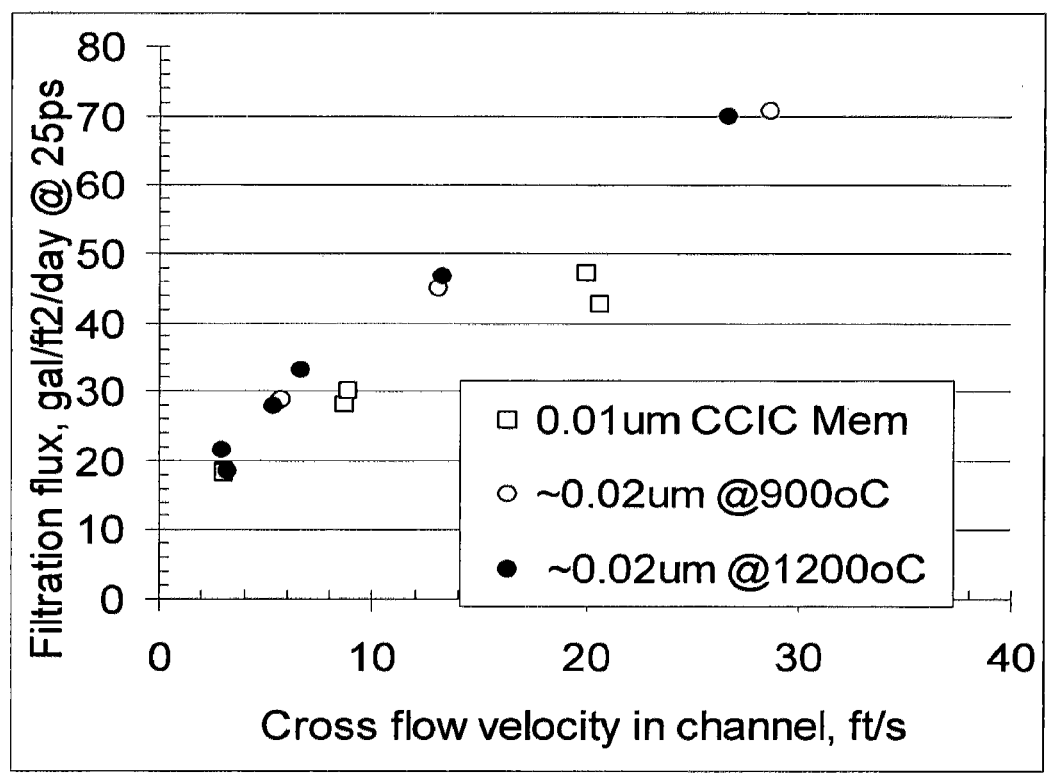
FIG. 9 is a plot of results obtained for an ultrafiltration test of the membranes described herein using a mixture of Ecoat™ paint and water.

Ultrafiltration tests using a mixture of Ecoat paint and water were performed on membranes prepared according to the procedures described in Examples 1 and 2. The membranes were fired at either 900° C. or 1200° C. A CCIC ultrafiltration membrane having a pore size of 10 nm was used as a benchmark for these tests. Results of the ultrafiltration tests of the membranes conducted are shown in FIG. 9. Membranes prepared according to the procedures described herein and fired at either 900° C. or 1200° C. exhibited either the same—or better—filtration function at larger flow velocities than the 10 nm CCIC membrane. This may be due to the higher water permeability of the membranes described herein. The ultrafiltration test also provides an estimation of the pore size. The experiment shows that the pore size of these membranes is similar to that of the CCIC 10 nm membrane. Thus, the present membranes, even after firing at high temperature, perform the filtration function as least as well as the CCIC membrane.

Example 7

Effect of δ-Alumina Concentration on Thickness of the Membrane Coating

Figure 10:
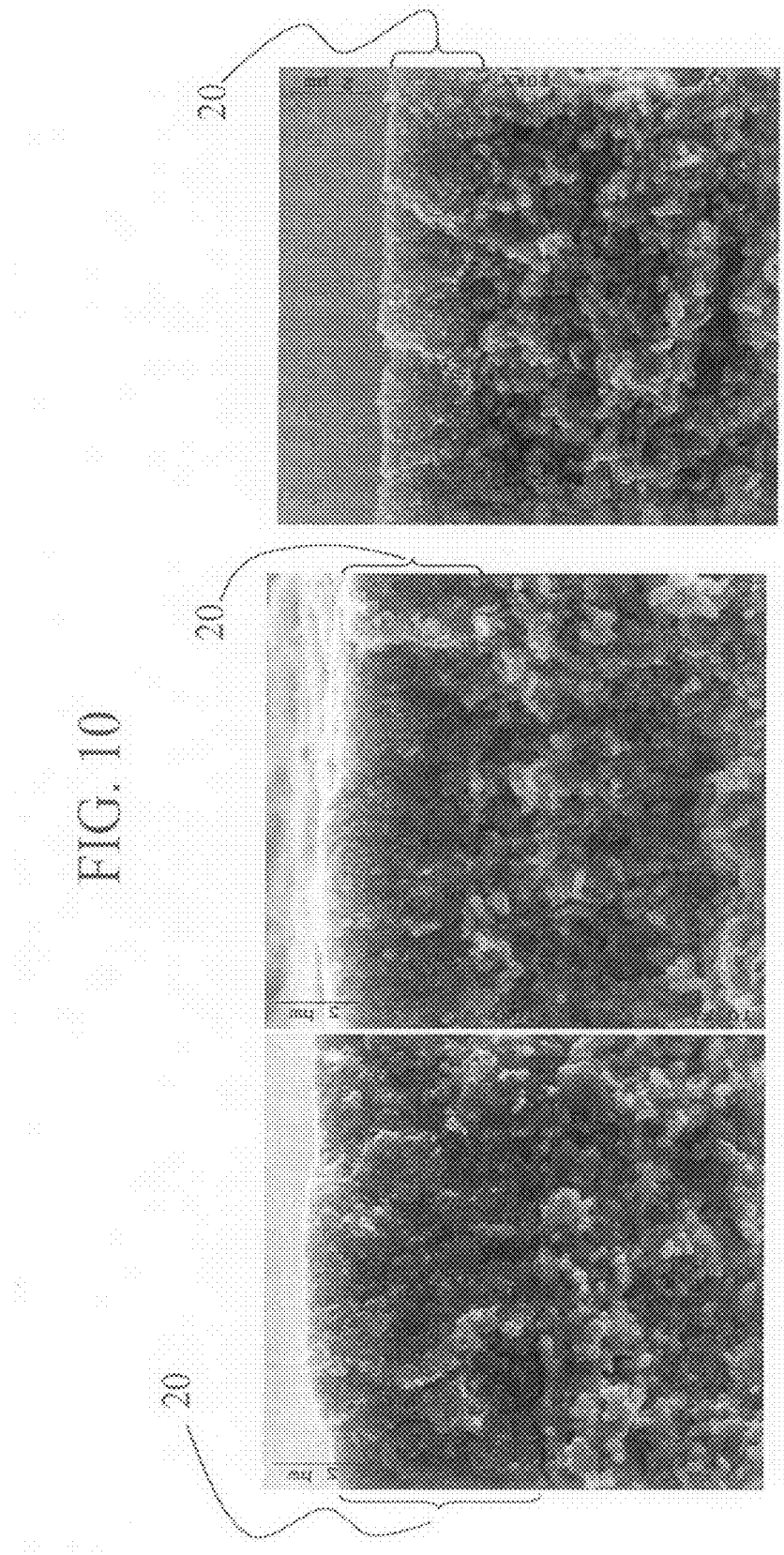
FIG. 10a-c shows SEM images of membranes prepared using coating slips comprising δ-$Al_2O_3$: a) 1.0 wt. % δ-$Al_2O_3$ (10,000× magnification); b) 0.7 wt. % δ-$Al_2O_3$ (10,000× magnification); and c) 0.5 wt. % δ-$Al_2O_3$ (10,000× magnification)

The thickness of the α-alumina membrane coating was studied as a function of δ-alumina concentration in the coating slip. Membranes were prepared according to the procedures described in Examples 1 and 2. Three coating slips, having δ-alumina concentrations of 0.5 wt. %, 0.7 wt. %, and 1.0 wt. %, respectively, were used to prepare the membranes. SEM images of the resulting membranes are shown in FIGS. 10a-c. The images show that the thickness of the coating membrane may be controlled by changing the δ-$Al_2O_3$ concentration in the coating slip. When the δ-$Al_2O_3$ concentration in the coating slip is 1.0 wt. %, the thickness of the membrane 20 is about 4 μm (FIG. 10a). A membrane having a thickness of 3 μm is obtained when the δ-$Al_2O_3$ concentration in the coating slip is 0.7 wt. %, (FIG. 10b). A further decrease of the δ-$Al_2O_3$ concentration in the coating slip to 0.5 wt. % yields a membrane thickness of 2 μm (FIG. 10c). Thicker membranes have lower permeability and are more susceptible to cracking. If, on the other hand, the membrane is too thin, pinhole defects are more likely to occur. Optimization of ultrafiltration membrane thickness depends on the roughness of the substrate. Based on the examples described herein, the optimal thickness of an ultrafiltration membrane of the present invention is about 2~3 μm. Membrane thickness may be controlled by changing the δ-$Al_2O_3$ concentration in the coating slip.

Example 8

Effect of Coating Slip pH on δ-Alumina Membrane Coating

Coating slips containing δ-alumina powder were prepared using the procedures described in Examples 1 and 2. The coating slips had pH values of 3.2, 3.5, and 3.9, respectively. SEM images of the membrane coatings deposited using coating slips having pH values of 3.2, 3.5, and 3.9 are shown in FIGS. 11a,b, and c, respectively. The results indicate that crack-free membranes are more easily formed when the pH of the coating slip is less than 3.5.

Example 9

Effect of Particle Size on δ-Alumina Membrane Coating

Using the procedures described in Examples 1 and 2, a δ-alumina membrane was prepared using δ-alumina powder having a particle size of 19 nm. SEM images of the surface and particle morphologies of the dried (at 120° C.) membrane prepared using 19 nm δ-alumina powder are shown in FIG. 12a-c. SEM images of the membrane after heating at 1200° C. are shown in FIG. 13a-c. These images show that membranes prepared using the 19 nm δ-alumina does not exhibit substantial increases in pore size or particle size after firing at high temperature and is therefore thermally stable. In addition, pore size decreases with decreasing crystal size of the raw δ-alumina powder.

Example 10

Effect of PEG Molecular Weight on δ-Alumina Particle Size Distribution

Figure 14:
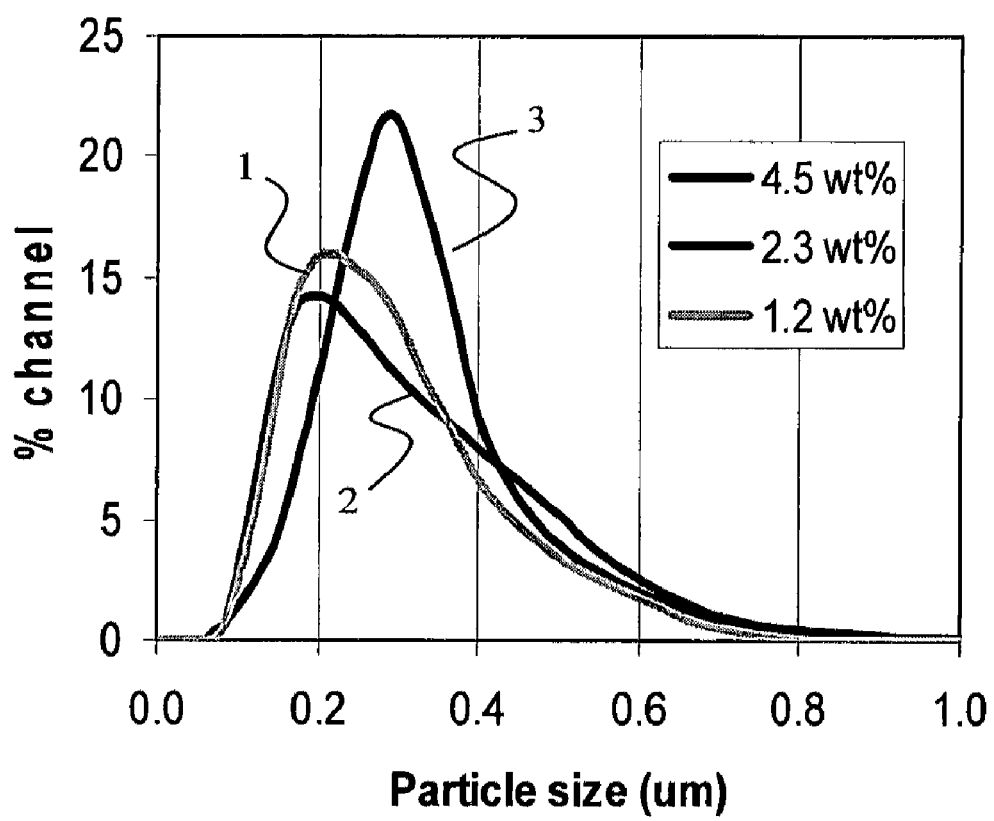
FIG. 14 is a plot of particle size distribution for coating slips comprising an aqueous solution of 1 wt. % δ-alumina and polyethylene glycol (PEG), having a molecular weight (MW) of 600, and: 1) 1.2 wt. % PEG; 2) 2.3 wt. % PEG; and 3) 4.5 wt. % PEG.
Figure 15:
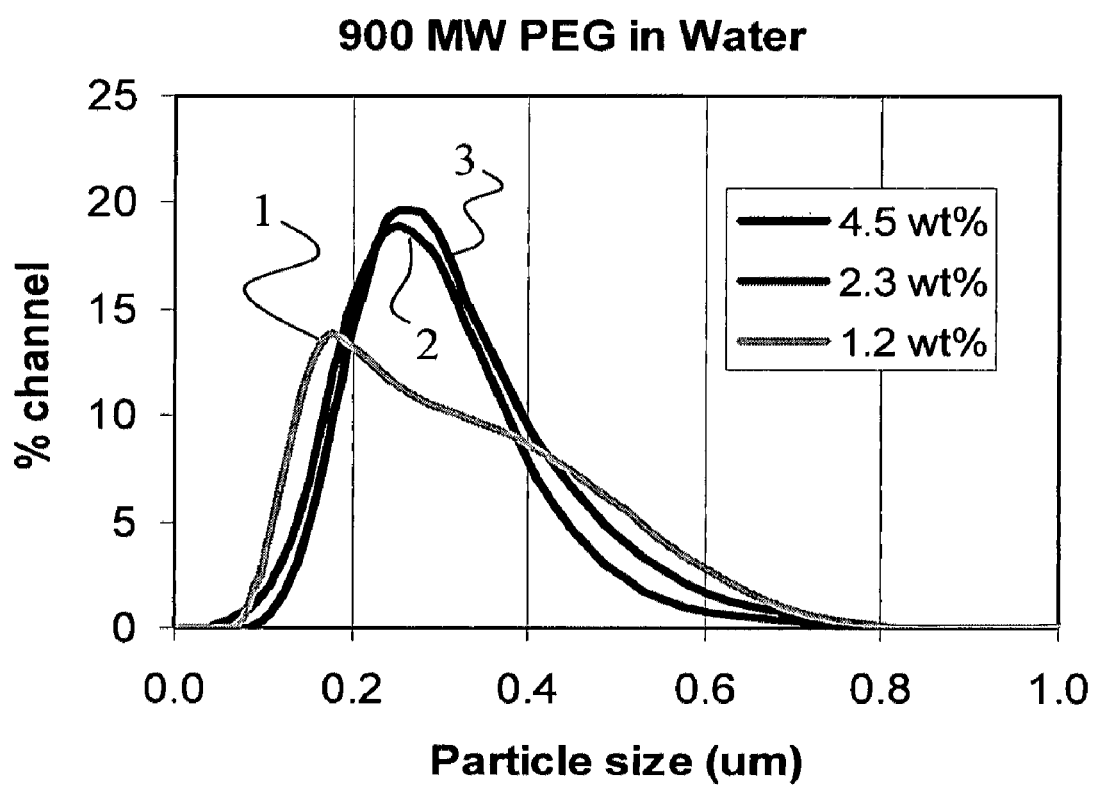
FIG. 15 is a plot of particle size distribution for coating slips comprising an aqueous solution of 1 wt. % δ-alumina and polyethylene glycol having 900 MW and: 1) 1.2 wt. % PEG; 2) 2.3 wt. % PEG; and 3) 4.5 wt. % PEG.
Figure 16:
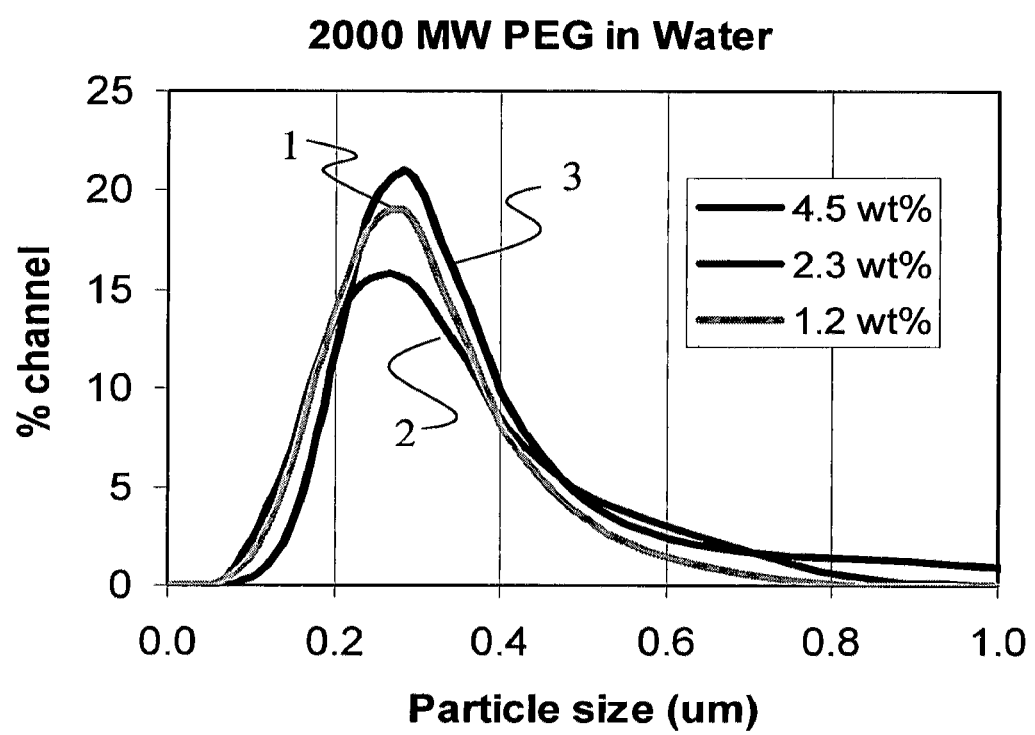
FIG. 16 is a plot of particle size distribution for coating slips comprising an aqueous solution of 1 wt. % δ-alumina and polyethylene glycol having 2,000 MW and: 1) 1.2 wt. % PEG; 2) 2.3 wt. % PEG; and 3) 4.5 wt. % PEG.
Figure 17:
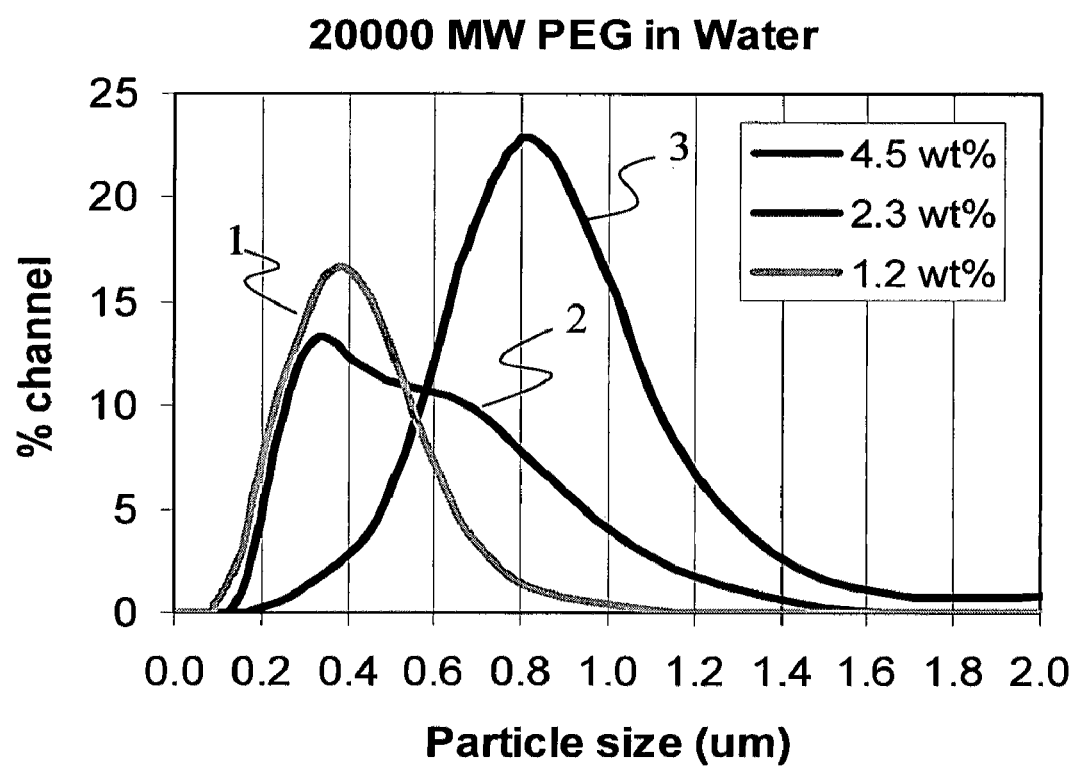
FIG. 17 is a plot of particle size distribution for coating slips comprising an aqueous solution of 1 wt. % δ-alumina and polyethylene glycol having 20,000 MW and: 1) 1.2 wt. % PEG; 2) 2.3 wt. % PEG; and 3) 4.5 wt. % PEG.

The particle size distribution in slips prepared with δ-alumina powder was measured as a function of PEG molecular weight and concentration. Aqueous solutions comprising 1 wt. % δ-alumina and polyethylene glycol having molecular weights (MW) of 600, 900, 2,000, and 20,000 were prepared in the same manner as previously described in Example 1. Particle size distributions obtained using light-scattering measurements are shown in FIGS. 14, 15, 16, and 17 for polyethylene glycol having 600 MW, 900 MW, 2,000 MW, and 20,000 MW, respectively. For each molecular weight, PEG concentrations of 1.2 wt. %, 2.3 wt. %, and 4.5 wt. % were prepared. The shapes of the size distribution peaks are an indication of the polymeric number (i.e., the number of particles that are agglomerated together) of the alumina particles. In FIGS. 14, 15, and 17 (PEG MWs of 600, 900 and 20,000), for example, the 4.5 wt % PEG slip (curve (3) in FIGS. 14-17) particle size distribution has a maximum at a larger particle size than the particle size distribution obtained for 1.2 wt. % (curve (1) in FIGS. 14-17) PEG slip, and the shapes of the particle size distributions obtained for 1.2 wt. % and 2.3 wt. % PEG concentrations appear to be polydisperse. In FIG. 17, the 4.5 wt % PEG slip particle size distribution has a maximum at 0.8 μm, whereas the 1.2 wt. % PEG slip size distribution has a maximum at 0.4 μm, indicating that dimers (i.e., an agglomerate comprising two particles) of alumina particles had been formed by wrapping the polymeric PEG molecules around the $Al_2O_3$ particles. The results therefore indicate that slips prepared using 2,000 MW PEG are most effective in providing mono-dispersed δ-alumina particles within the largest concentration window.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. An inorganic membrane, the inorganic membrane comprising α-alumina, wherein the α-alumina has a pore structure having a mean pore size of up to about 50 nm and a mean particle size in a range from about 10 nm to about 100 nm, and wherein the α-alumina is formed by:
   a. providing a coating slip, the coating slip comprising δ-alumina;
   b. applying the coating slip to a support surface to form a coating layer;
   c. drying the coating layer; and
   d. firing the dried coating layer at a temperature of at least about 1000° C. to convert at least a portion of the δ-alumina to α-alumina and form the inorganic membrane, wherein the pore structure is stable at temperatures in a range from 1200° C. up to about 1400° C.

2. The inorganic membrane according to claim 1, wherein the inorganic membrane is disposed on a substrate.

3. The inorganic membrane according to claim 2, wherein the substrate comprises one of α-alumina, mullite, and combinations thereof.

4. The inorganic membrane according to claim 1, wherein the mean pore size is in a range from about 10 nm to about 50 nm.

5. The inorganic membrane according to claim 1, wherein the inorganic membrane has a thickness in a range from about 1 μm to about 10 μm.

6. A method of making an inorganic membrane comprising α-alumina, the method comprising the steps of:
   a. providing a coating slip, the coating slip comprising δ-alumina;
   b. applying the coating slip to a support surface to form a coating layer;
   c. drying the coating layer; and
   d. firing the dried coating layer at a temperature of at least about 1000° C. to convert at least a portion of the δ-alumina to α-alumina and form the inorganic membrane, wherein the α-alumina has a pore structure having a mean pore size of up to about 100 nm and a mean particle size in a range from about 10 nm to about 50 nm, wherein the pore structure is stable at temperatures in a range from 1200° C. up to about 1400° C.

7. The method according to claim 6, wherein the step of providing the coating slip comprises: preparing an aqueous solution comprising from about 0.1 wt. % to about 10 wt. % δ-alumina and about 1 wt. % to about 10 wt. % of at least one organic additive.

8. The method according to claim 7, wherein the at least one organic additive comprises a polymeric binder.

9. The method according to claim 8, wherein the polymeric binder is polyethylene glycol.

10. The method according to claim 9, wherein the polyethylene glycol has a molecular weight in a range from about 2,000 to about 20,000.

11. The method according to claim 6, wherein the step of applying the coating slip to a support surface to form the coating layer comprises applying the coating slip to a support surface by one of dip coating, slip coating, slip casting, and forced flow coating to form the coating layer.

12. The method according to claim 6, wherein the step of drying the coating layer comprises drying the coating layer in a controlled gas environment.

13. The method according to claim 6, wherein the step of firing the dried coating layer at a temperature of at least about 1000° C. to convert at least a portion of the δ-alumina to α-alumina comprises firing the dried coating layer in a controlled gas environment.

* * * * *